United States Patent [19]
Liegel et al.

[11] Patent Number: 5,493,925
[45] Date of Patent: Feb. 27, 1996

[54] UPPER BODY COUPLER MOUNTING ASSEMBLY

[75] Inventors: Reinald D. Liegel; James C. Graham, both of Waukesha, Wis.

[73] Assignee: Hein-Werner Corporation, Waukesha, Wis.

[21] Appl. No.: 83,974

[22] Filed: Jun. 28, 1993

[51] Int. Cl.$^6$ ............................................. G01D 11/30
[52] U.S. Cl. ................................. 73/866.5; 73/661
[58] Field of Search ................. 73/866.5, 661, 73/118.1; 248/542, 122, 125, 222.1, 231.9, 274, 904

[56] References Cited

U.S. PATENT DOCUMENTS

| | | | |
|---|---|---|---|
| 2,780,094 | 2/1957 | Fink | 73/866.5 |
| 3,741,004 | 6/1973 | Posakong | 73/620 |
| 4,660,800 | 4/1987 | Horstketter | 249/24 |
| 4,811,250 | 3/1989 | Steber et al. | 364/551 |
| 4,989,519 | 2/1991 | Welsch et al. | 108/111 |
| 5,152,487 | 10/1991 | Defatte et al. | 248/225.1 |
| 5,165,455 | 11/1992 | De Crane | 141/10 |
| 5,366,191 | 11/1994 | Bekanich | 248/125 |
| 5,379,643 | 1/1995 | Taylor | 73/661 X |

FOREIGN PATENT DOCUMENTS 2203551  10/1988  United Kingdom ............... 73/866.5

Primary Examiner—Thomas P. Noland
Attorney, Agent, or Firm—James A. Wilke

[57] ABSTRACT

A mounting assembly is provided for use with a vehicle measuring system where the point to be measured is transferred, within the measurement system, to an accessible location measurable by the system. The mounting assembly couples a measurement device to a vehicle to be measured and maintains the precise alignment of a coupler at its attachment point to the vehicle during the measurement procedure.

5 Claims, 5 Drawing Sheets

UPPER BODY COUPLER MOUNTING ASSEMBLY

FIELD OF THE INVENTION

The present invention relates to vehicle measurement systems and in particular to a mounting assembly for mounting and positioning a coupler used for coupling a measurement device to a vehicle.

BACKGROUND OF THE INVENTION

The Assignee of this invention is also the applicant of a disclosure for a vehicle measurement system as described in the International Patent Application, namely PCT/GB92/01509, International Publication Number: WO 93/04381, Publication Date: Mar. 4, 1993 a copy of which is attached hereto and incorporated herein as if fully set forth. Said Vehicle Measurement System utilizes acoustic pulses generated by emitters and detected by receivers. The emitters are typically mounted to the vehicle being measured and the receivers are arranged along a side of a beam which is positioned near the vehicle being measured. A microprocessor controls the emission of the pulses and measures the travel time of the pulses from the emitters to each of the receivers. The microprocessor also performs the necessary calculations for the measurements of the vehicle and controls the several output methods available to the operator of the vehicle measuring system.

An important feature of the vehicle measurement system disclosed in the above described application is the ability to operate in a garage environment with various air currents and temperature variations. That feature is facilitated by, among other things, placing the emitter as close to the receiver array as is practicable for the type of measurement point being made. The majority of measurement points made using the Applicant's disclosed system are located under the vehicle being measured. For purposes of measuring a point on the front suspension strut, the Applicant discloses an upper body coupler 78 that is attached to a ball-and-socket joint 96. Although convenient for the particular measurement described, other upper body points cannot be easily measured, The operator of the vehicle measurement system must attach the upper body coupler to the point to be measured at one end of the coupler and position the other end of the coupler so that the emitter mounted on that second end is in usefull proximity to the receiver array on the beam. A lightweight easily positioned upper body coupler is preferable to a cage-type assembly for mounting an emitter or the beam with microphones above the underside of the vehicle.

SUMMARY OF THE INVENTION

The mounting assembly of the present invention may be used with a vehicle measuring system where the point to be measured is transferred, within the measurement system, to an accessable location measurable by the system.

The present invention also provides a unique mounting assembly for a coupler for coupling a signal emitter to a vehicle used in an acoustic vehicle measurement apparatus. The mounting assembly attaches to one end of the coupler and maintains the precise alignment of the coupler at its attachment point to the vehicle being measured.

The mounting bracket comprises an L-shaped bracket which engages one end of the coupler with a mounting stud on a short portion of the mounting bracket and is attached to the vehicle with a locating cylinder having a frustoconical end engaging a center bore in the long portion of the mounting bracket. The locating cylinder aligns the coupler with the point to be measured by the acoustic vehicle measuring apparatus.

Another important feature of the present invention is that the coupler is supported by a collar attached to the coupler, with the collar fixed to a support stand immediately adjacent to the vehicle being measured, thereby not introducing deflection error in the measurement being taken. An alternative embodiment to the mounting stand is the use of a positioning rod with the collar to support the coupler using the vehicle being measured as part of the support mechanism.

Another important feature of the present invention is that orientation of the mounting assembly can be varied without disturbing the coupler alignment.

Other principal features and advantages of the present invention will become apparent to those skilled in the art upon review of the following drawings, the detailed description of the appended claims.

DETAILED DESCRIPTION OF THE PREFERRED EMBODIMENT

Figure 1:
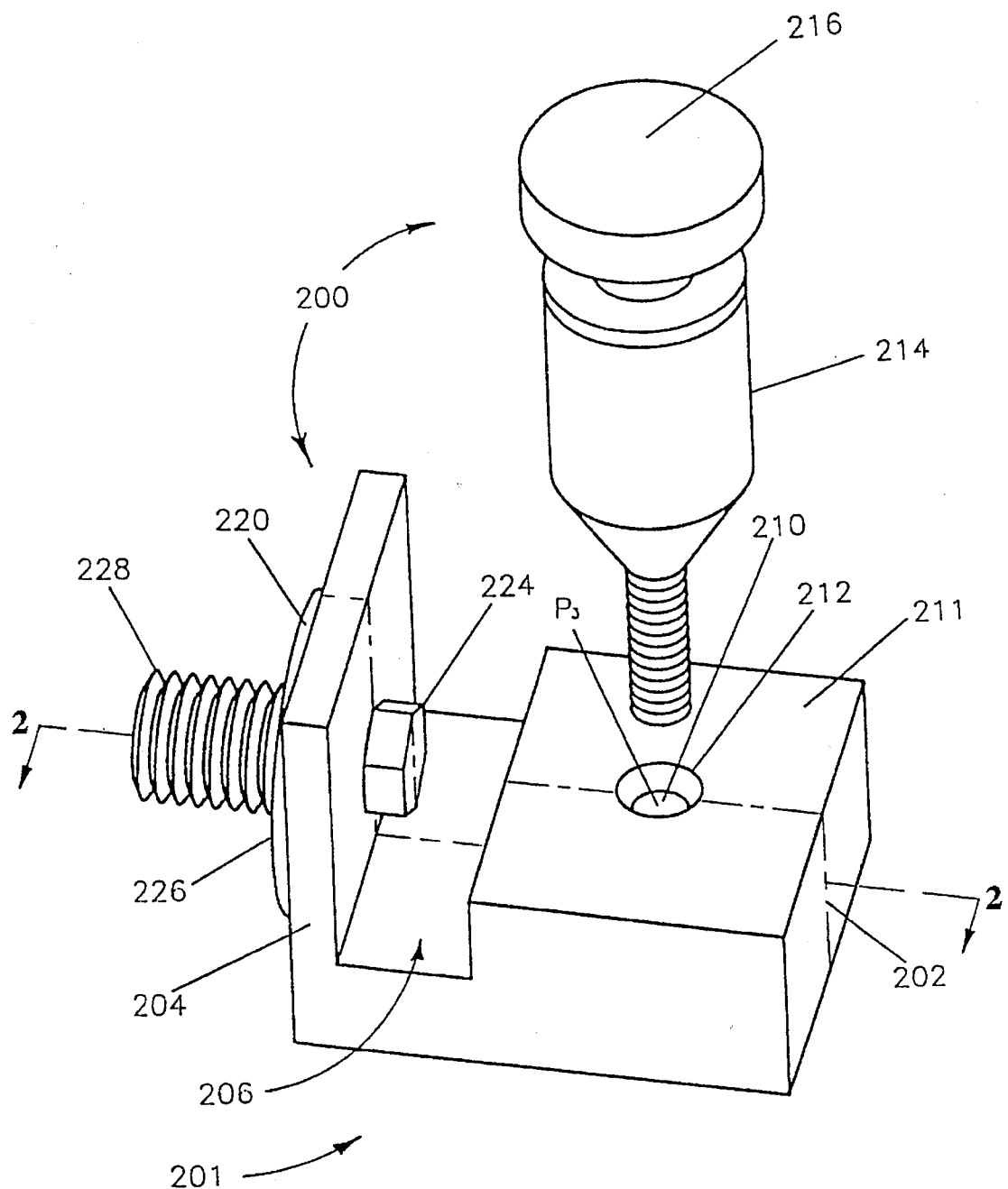
FIG. 1 is an isometric view of the mounting bracket.
Figure 2:
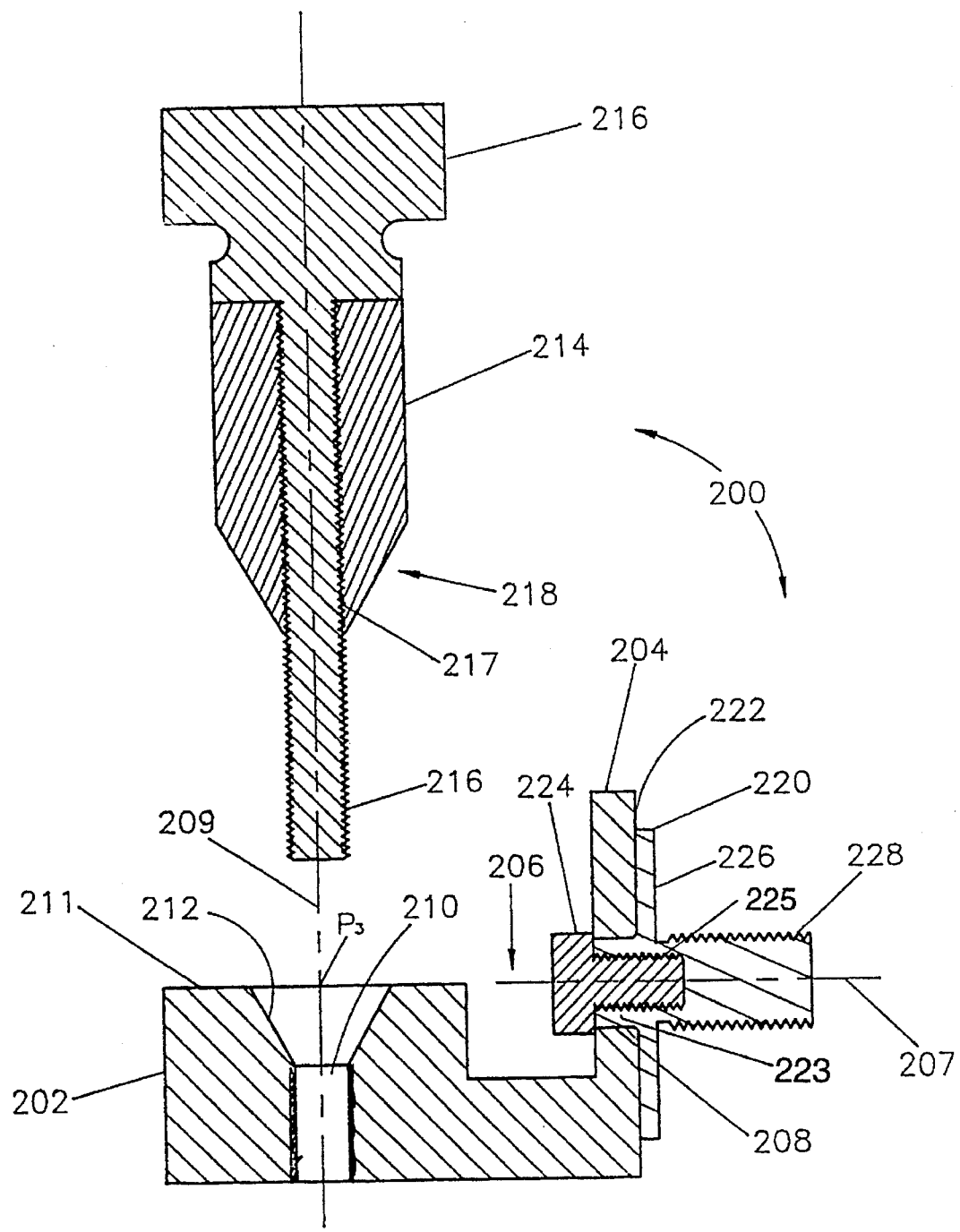
FIG. 2 is a sectional plan view of the mounting bracket through Section 2—2. shown in FIG. 1.

FIGS. 1 and 2 show an isometric view and section view of the present invention. Generally, a mounting assembly 200 comprising three principal parts, the mounting bracket 201, the locating cylinder 214 and the connector disk 220, is used to attach a coupler 278 to a vehicle.

The mounting bracket 201 is substantially L-shaped and has a long portion 202 and a short portion 204. The mounting bracket may be constructed, either molded or machined, from a suitable material. The preferred embodiment of the present invention uses machined aluminum.

A notch 206 is defined at the junction of the long and short portions of the mounting bracket to facilitate placement of the bracket 201 on the vehicle V. The short portion 204 is provided with a top bore 208 adapted to receive the connector disk 220. The connector disk 220 has a first disk face 222 and a second disk face 226 with the first disk face 222 including a first stud 223 having a threaded bore 225. Said first stud 223 engages the top bore 208 and is rotably fastened to the mounting bracket by a bolt 224 threadly engaging the threaded bore 225. The second disk face 226 includes a centrally located second stud 228, which second stud is threaded to engage the second end 292 of the coupler 278. The long portion 202 of the mounting bracket 201 is provided with a center bore 210 extending through said long portion 202 of the mounting bracket. The center bore 210 is counter sunk which provides a frustoconical surface 212 annular to the axis 209 of the center bore 210. The center bore 210 is threaded to receive the adjustment screw 216. The long portion 202 also defines a plane 211 which is perpendicular to the short portion 204 of the mounting bracket 201 and intersects the center of the top bore 208 along and parallel to the axis 207 of the top bore 208. The point of intersection $P_3$ of the axis 207 of the top bore 208 and the axis 209 of the center bore 210 on the plane 211 is more fully described below.

The mounting assembly 200 includes a locating cylinder 214 which is provided with a centrally located through bore 217 on the longitudinal axis and is adapted to receive and threadly engage the adjustment screw 216. One end of the locating cylinder is provided with a frustoconical end 218 corresponding to the frustoconical surface 212 on the mounting bracket 201.

Figure 3:
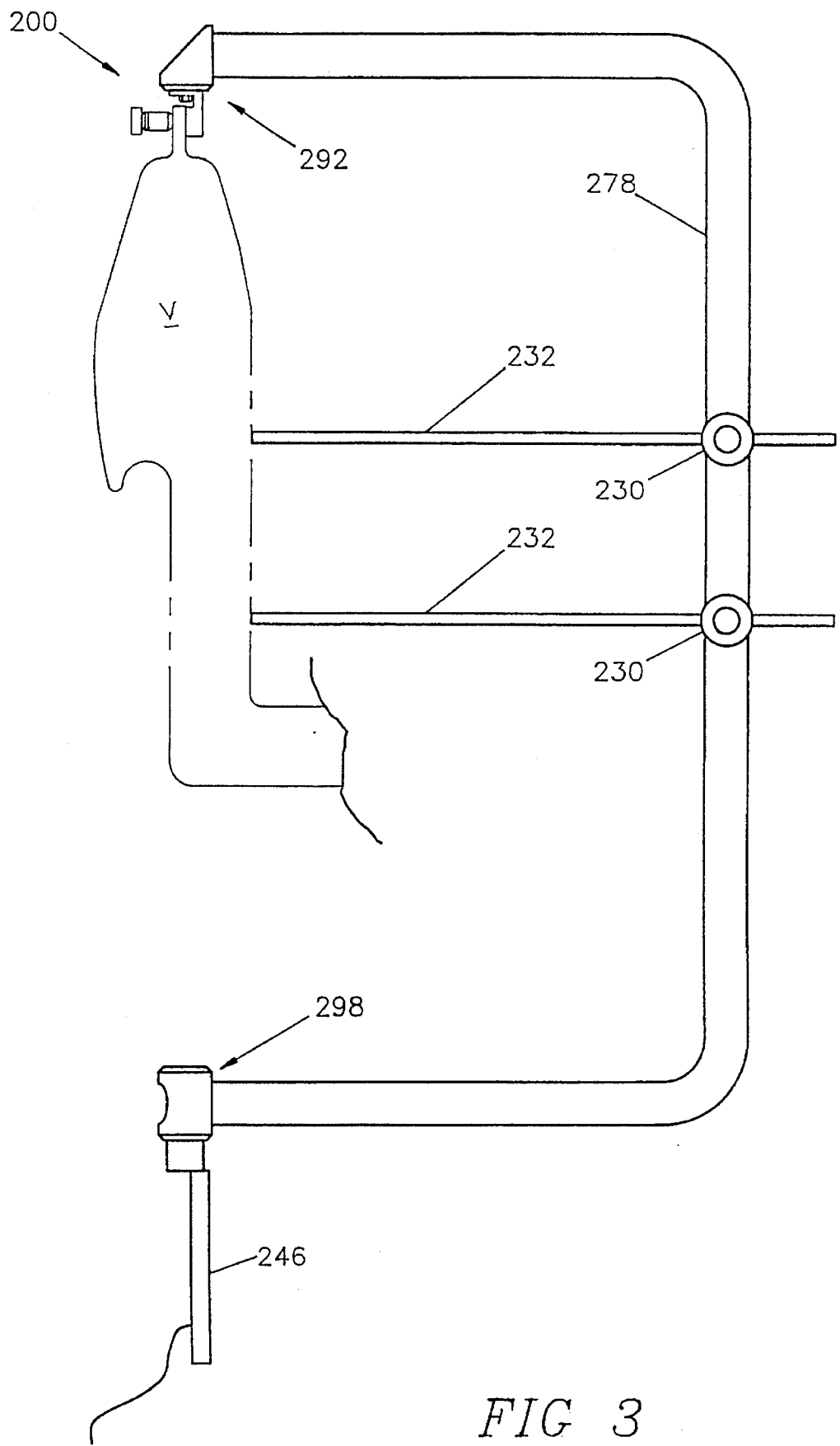
FIG. 3 is an illustration of the coupler attached to a vehicle section with the mounting bracket and the coupler being supported by a stand.
Figure 3A:
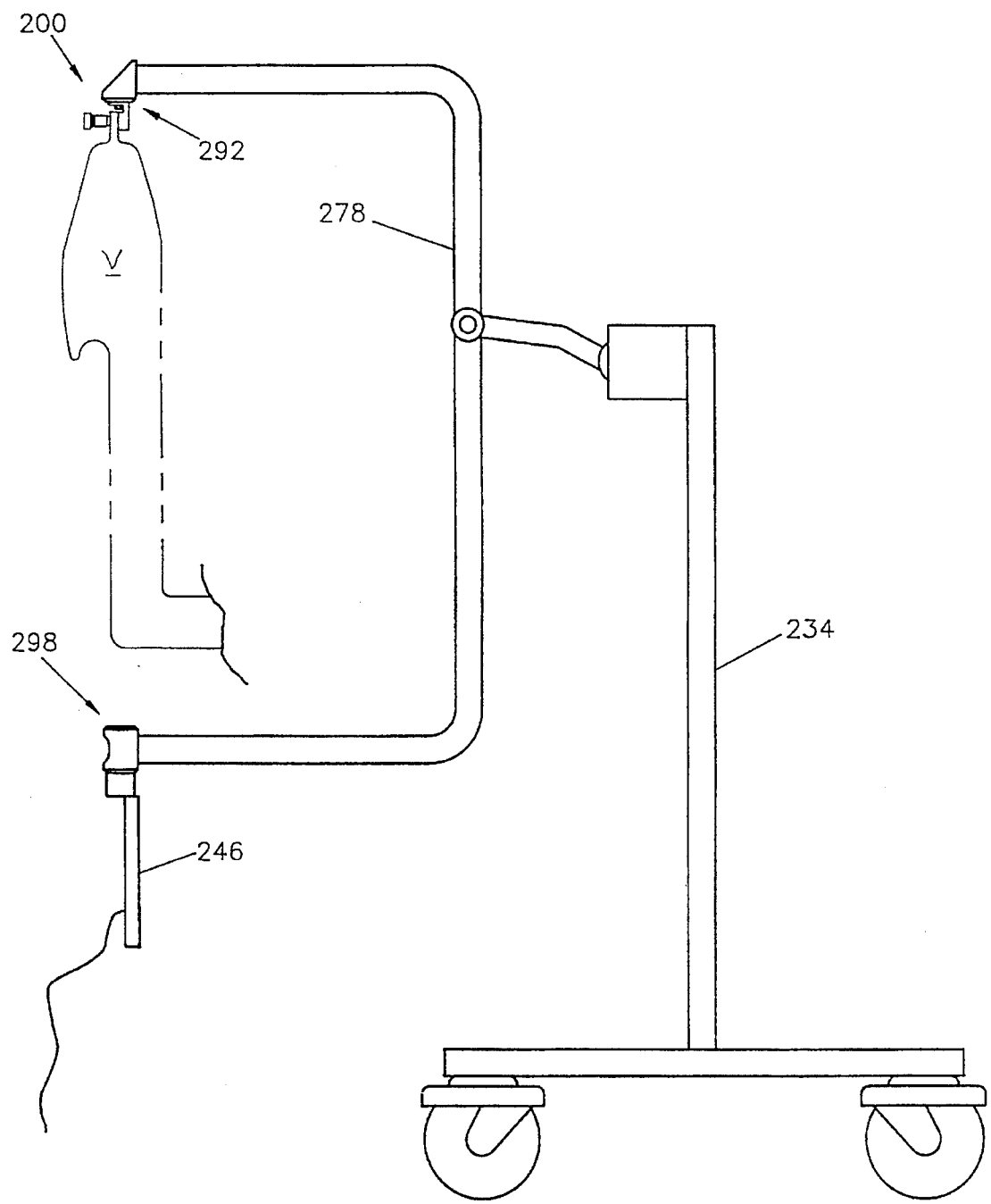
FIG 3A is an illustration of an alternative embodiment of a coupler support.

In operation the mounting assembly is used to locate one end of the coupler 278 which coupler is used in the acoustic vehicle measurement system disclosed in PCT/GB92/01509. Referring to FIGS. 3 and 3a, there is illustrated two arrangements of the present invention. The coupler 278 has a first end 298 which is adapted to engage a measuring device 246 and a second end 292 which is attached to the vehicle V to be measured. The foreign application discloses a ball and socket assembly threadly engaging the coupler 278. Such ball and socket assembly cannot practically locate the center of a hole in a vertical plane located in the upper body of the vehicle V. The present invention does locate the center of a hole in the upper body of a vehicle by placing the mounting bracket 201 against the vehicle surface having the hole to be measured and threadedly engaging the center bore 210 through the hole to be measured with the adjustment screw 216 until the frustoconical end 218 of the locating cylinder 214 is snug against the vehicle surface having the hole to be measured. The coupler 278 is then attached to the second stud 228 of the connector disk 220. The coupler 278 may be supported by a support collar 230 attached to the coupler and at least one positioning rod 232 mounted in the collar. An alternative embodiment of the coupler support is a stand 234 positioned adjacent to the vehicle to be measured and attached to the coupler 278. The purpose of the collar and positioning rod assembly and the stand is to minimize the deflection of the coupler and to maintain the alignment of $P_3$ with the measurement device 246 during the measurement procedure. The critical aspect of the present invention is that the distance from $P_3$ to the second disk face 226 is the same as the distance from the center of the ball to the surface contacting the coupler in the ball and socket assembly disclosed in the parent application. Measurements of the vehicle can proceed as described in the parent application but can now include selected upper body points on the vehicle being measured.

Figure 3B:
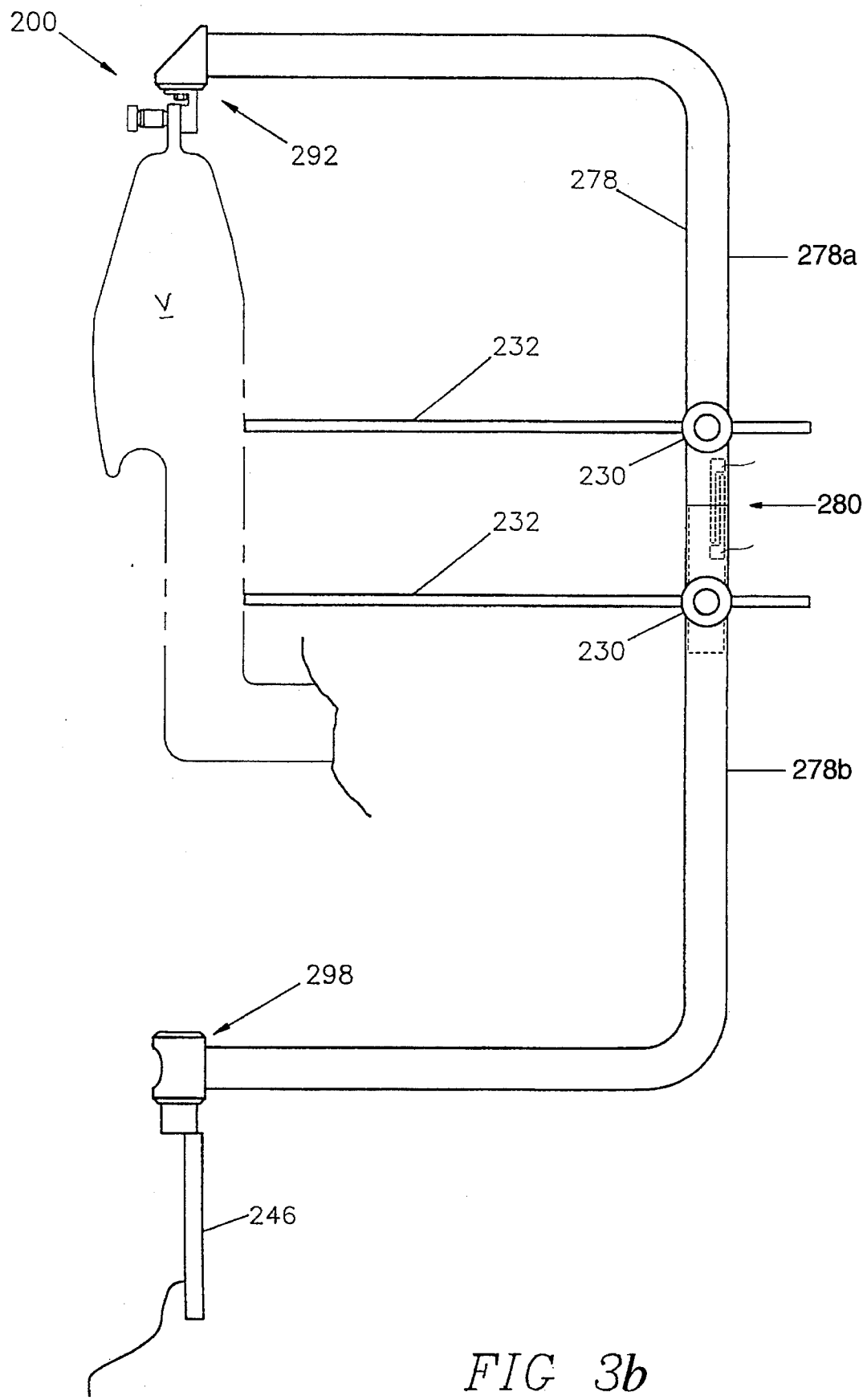
FIG. 3*b* is an illustration of an alternative embodiment of a coupler with a telescoping construction and having a suitable (dotted line) transducer.

Referring to FIG. 3b, the coupler can also be provided with a telescoping construction to allow configuration of the coupler members, with telescoping coupler members 278a and 278b, that will accommodate several vehicle contours and still place the measurement device 246 in a usefull proximity to the vehicle measuring system. The telescoping construction may include a suitable transducer 280 to determine the extent of variance in the length of the coupler member 278 and transmit that variance determination to a micro-processor of the measurement system.

Thus, it should be apparent that there has been provided in accordance with the present invention an upper body coupler mounting assembly for use with a vehicle measurement system that satisfies the objectives and advantages set forth above. Although the invention has been described in conjunction with specific embodiment thereof, it is evident that many alternatives, modifications and variations will be apparent to those skilled in the art. Accordingly, it is intended to embrace all such alternatives, modifications and variations that fall within the spirit and broad scope of the appended claims.

We claim:

1. A mounting assembly for a coupler for coupling a measuring device to a vehicle measurement apparatus, with such coupler having one end for mounting at least one measuring device and a second end, for connection to the vehicle, having a surface with a center line, with the mounting assembly comprising, in combination:

a mounting bracket having a a long portion and a short portion, with the long portion defining a plane perpendicular to the short portion and having a center bore with a frustoconical surface annular to a longitudinal center line of said center bore and said short portion has a surface co-planar with the surface of the second end of the coupler and has a top bore with said top bore having an axis perpendicular to a plane normal to the plane defined by the long portion, a locating cylinder having a through bore along a central longitudinal axis of said cylinder with said central longitudinal axis intersecting the center line of the top bore in the short portion of the mounting bracket at a right angle, thereby defining a point and with said cylinder having at least one frustoconical end corresponding to the center bore, and an adjustment screw adapted to engage the through bore in the locating cylinder and the center bore in the mounting bracket.

2. The mounting assembly of claim 1 wherein the coupler is provided with at least one telescoping member, selectably adjustable to accommodate a contour of the vehicle.

3. The mounting assembly of claim 2 wherein the telescoping member of the coupler is further provided with a transducer to determine extent of variance in the length of the coupler member and transmit such variance to a microprocessor of the vehicle measurement system.

4. The mounting assembly of claim 1 further comprising a mounting collar attached to the coupler with said mounting collar adapted to support at least one positioning rod.

5. The mounting assembly of claim 4 wherein the mounting collar is adapted to engage a stand adjacent to the vehicle.

* * * * *